United States Patent
Zhou et al.

(10) Patent No.: US 8,411,738 B2
(45) Date of Patent: Apr. 2, 2013

(54) SYSTEM AND METHOD FOR IDENTIFICATION OF VERTICAL SCROLLING REGIONS IN DIGITAL VIDEO

(75) Inventors: Zhi Zhou, Irvine, CA (US); Yeong-taeg Kim, Irvine, CA (US)

(73) Assignee: Samsung Electronics Co., Ltd., Suwon, Gyeonggi-do (KR)

( * ) Notice: Subject to any disclaimer, the term of this patent is extended or adjusted under 35 U.S.C. 154(b) by 630 days.

(21) Appl. No.: 12/403,182

(22) Filed: Mar. 12, 2009

(65) Prior Publication Data

US 2010/0232713 A1 Sep. 16, 2010

(51) Int. Cl.
*H04N 7/12* (2006.01)
(52) U.S. Cl. .................................. 375/240.01
(58) Field of Classification Search .............. 375/240.01, 375/240.16; *H04N 7/12*
See application file for complete search history.

(56) References Cited

U.S. PATENT DOCUMENTS

| | | | |
|---|---|---|---|
| 5,914,757 A * | 6/1999 | Dean et al. ..................... | 348/584 |
| 7,079,159 B2 | 7/2006 | Yang | |
| 7,548,276 B2 * | 6/2009 | Mizuhashi et al. ........... | 348/459 |
| 2005/0232357 A1 * | 10/2005 | Hubrich et al. ........... | 375/240.16 |
| 2007/0133685 A1 * | 6/2007 | Seong et al. ............. | 375/240.16 |
| 2009/0016618 A1 | 1/2009 | Zhou | |

* cited by examiner

*Primary Examiner* — Nhon Diep
*Assistant Examiner* — Tracy Li

(57) ABSTRACT

A vertical scrolling region detector may include a motion estimator that can generate motion vectors between blocks of two or more primary frames of a mixed-mode video sequence. The detector may also include a primary frame motion analyzer that can analyze the motion vectors to detect substantially constant vertical motion of at least some of the blocks between the two or more primary frames. The presence of substantially constant vertical motion may reflect the presence of a vertical scrolling region in the mixed-mode video sequence. Moreover, the detector may also include a consecutive frame motion analyzer that can calculate differences in pixel values between lines of two or more consecutive frames in the mixed-mode video sequence. The differences in pixel values may further reflect the presence of the vertical scrolling region in the mixed-mode video sequence.

4 Claims, 8 Drawing Sheets

SYSTEM AND METHOD FOR IDENTIFICATION OF VERTICAL SCROLLING REGIONS IN DIGITAL VIDEO

BACKGROUND

Description of the Related Technology

Multimedia processing systems, such as video encoders, often transcode or transform multimedia data for various purposes, such as to ensure compatibility with various display standards or to achieve a frame rate that differs from that of the display device. Frame rate conversion by pulldown is one example of a transformation of multimedia data. Pulldown can include repeating source frames in a pattern to generate an output video signal which possesses more frames than the original. For example, when film (e.g., television or movie film) is transferred to video, pulldown can be used to convert 24 frames per second of film to 60 fields per second of interlaced video. At 24 frames per second, there are four frames of film for every five frames of 60 Hz interlaced video because the 60 Hz video includes information for 30 full frames. The pulldown process can repeat certain frames so that every four frames of film fill five frames of video.

One common form of pulldown is 3:2 pulldown (or equivalently, 2:3 pulldown). In 3:2 pulldown, one film frame is repeated across three fields, the next across two, the next across three, and so on. In interlaced pulldown, the fields alternate as even and odd interlaced fields of the original film frames. In progressive-scan pulldown, each field is a complete copy of an original film frame.

One disadvantage of the 3:2 pulldown process is that it creates a slight error in the video signal, which can be seen in the final image. As a result, the output video signal may appear less smooth than the original version. This error is sometimes referred to as motion judder and may be corrected by the process of motion judder cancellation. Motion judder cancellation can include extracting original frames from the output video signal and performing a new frame rate conversion on the original frames, resulting in a smoother video sequence.

SUMMARY OF CERTAIN INVENTIVE ASPECTS

In certain embodiments, a processor-implemented method of detecting a vertical scrolling region in digital video includes generating a plurality of motion vectors between blocks of two or more primary frames of a mixed-mode video sequence, analyzing the motion vectors to detect substantially constant average vertical motion of at least some of the blocks between the two or more primary frames, calculating differences in pixel values between blocks of two or more consecutive frames in the mixed-mode video sequence, and in response to determining that substantially constant vertical average motion is present and that the differences in pixel values are greater than a threshold, determining that a vertical scrolling region exists in the mixed-mode video sequence.

In certain embodiments, a vertical scrolling region detector may include a motion estimator that can generate motion vectors between blocks of two or more primary frames of a mixed-mode video sequence. The detector may also include a primary frame motion analyzer that can analyze the motion vectors to detect substantially constant vertical motion of at least some of the blocks between the two or more primary frames. The presence of substantially constant vertical motion may reflect the presence of a vertical scrolling region in the mixed-mode video sequence. Moreover, the detector may also include a consecutive frame motion analyzer that can calculate differences in pixel values between lines of two or more consecutive frames in the mixed-mode video sequence. The differences in pixel values may further reflect the presence of the vertical scrolling region in the mixed-mode video sequence.

In certain embodiments, a computer-readable medium may be provided that has instructions stored thereon that cause one or more processors to perform a method of detecting vertical scrolling text. This method may include receiving a mixed-mode video sequence comprising a pulldown video sequence and vertical scrolling text in one or more frames of the pulldown video sequence, detecting vertical scrolling text in the one or more frames of the mixed-mode video sequence, and in response to detecting the vertical scrolling text, bypassing a motion judder cancellation process for the one or more frames of the pulldown video sequence.

Moreover, in various embodiments, a vertical scrolling text detector may be implemented in one or more processors, such that the vertical scrolling text detector may receive a digital video signal having vertical scrolling text mixed with a pulldown video sequence comprising primary frames and repeated frames. The scrolling text detector may include a motion estimator that can determine a plurality of motion vectors between blocks of the primary frames. In addition, the vertical scrolling text detector may include primary frame motion analyzer that can: determine a first peak vertical motion vector between first and second primary frames and a second peak vertical motion vector between the second primary frame and a third primary frame, average a value of the first peak vertical motion vector over the first primary frame and its repeated frames to produce a first average, average a value of the second peak vertical motion vector over the second primary frame and its repeated frames to produce a second average, and determine whether the first and second averages are approximately equal. Moreover, the vertical scrolling text detector may include a consecutive frame motion analyzer that can: calculate differences in pixel values between blocks of two or more consecutive frames between the first and third primary frames, and in response to said determination that the first and second averages are approximately equal and that the differences in pixel values are greater than a threshold, determine that vertical scrolling text exists in the digital video signal.

For purposes of summarizing the disclosure, certain aspects, advantages and novel features of certain inventions have been described herein. It is to be understood that not necessarily all such advantages may be achieved in accordance with any particular embodiment of the inventions disclosed herein. Thus, the inventions disclosed herein may be embodied or carried out in a manner that achieves or optimizes one advantage or group of advantages as taught herein without necessarily achieving other advantages as may be taught or suggested herein.

BRIEF DESCRIPTION OF THE DRAWINGS

Throughout the drawings, reference numbers may be re-used to indicate correspondence between referenced elements. The drawings are provided to illustrate embodiments of the inventions described herein and not to limit the scope thereof.

DETAILED DESCRIPTION

I. Introduction

This disclosure describes certain systems and methods for detecting vertical scrolling regions, such as scrolling text, in digital video. The scrolling regions may be detected by determining, among other things, whether substantially constant vertical motion exists between different frames and/or by analyzing differences in pixel values between frames.

Figure 1:
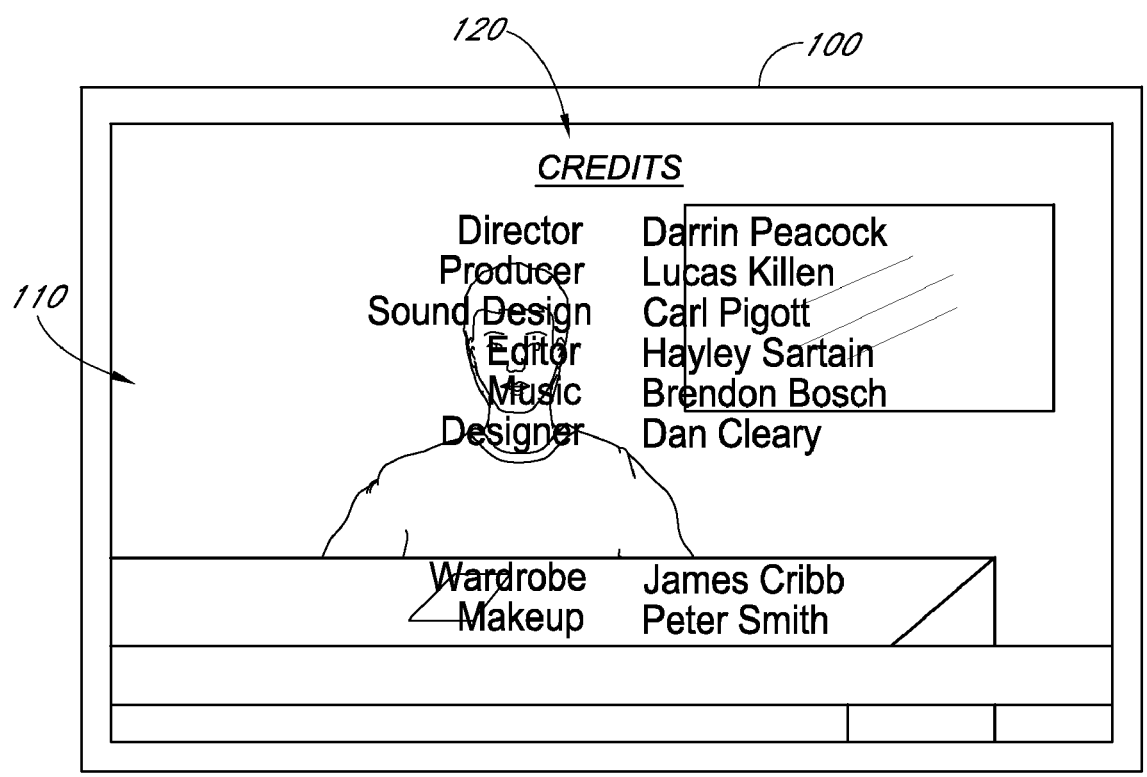
FIG. 1 illustrates an example display with video and vertical scrolling text.

In post-production processes, media studios occasionally add scrolling text to a film, which may be a movie, television show, or the like. This scrolling text might include horizontal scrolling text, such as captions or tickers, or vertical scrolling text, such as credits. An example of vertical scrolling text 120 is shown in FIG. 1. In this example, the scrolling text 120 includes credits that include information about a film 130 (e.g., television show or movie). The scrolling text 120 overlays the film 130 being shown on a display 100.

Since the scrolling text 120 may have been added in post-production, the scrolling text 120 may be mixed with a film that has already been through a pulldown process, e.g., 3:2 pulldown. The resulting signal from the pulldown process may be referred to as a mixed-mode video sequence (MMVS). As described above, pulldown can result in motion judder. Motion judder cancellation may therefore be applied to the MMVS. However, when scrolling text is present in the MMVS, motion judder cancellation can introduce judder in the scrolling text. Judder occurs in the scrolling text, but not the film, because the scrolling text is moving through frames where the film is not moving.

Figure 2:
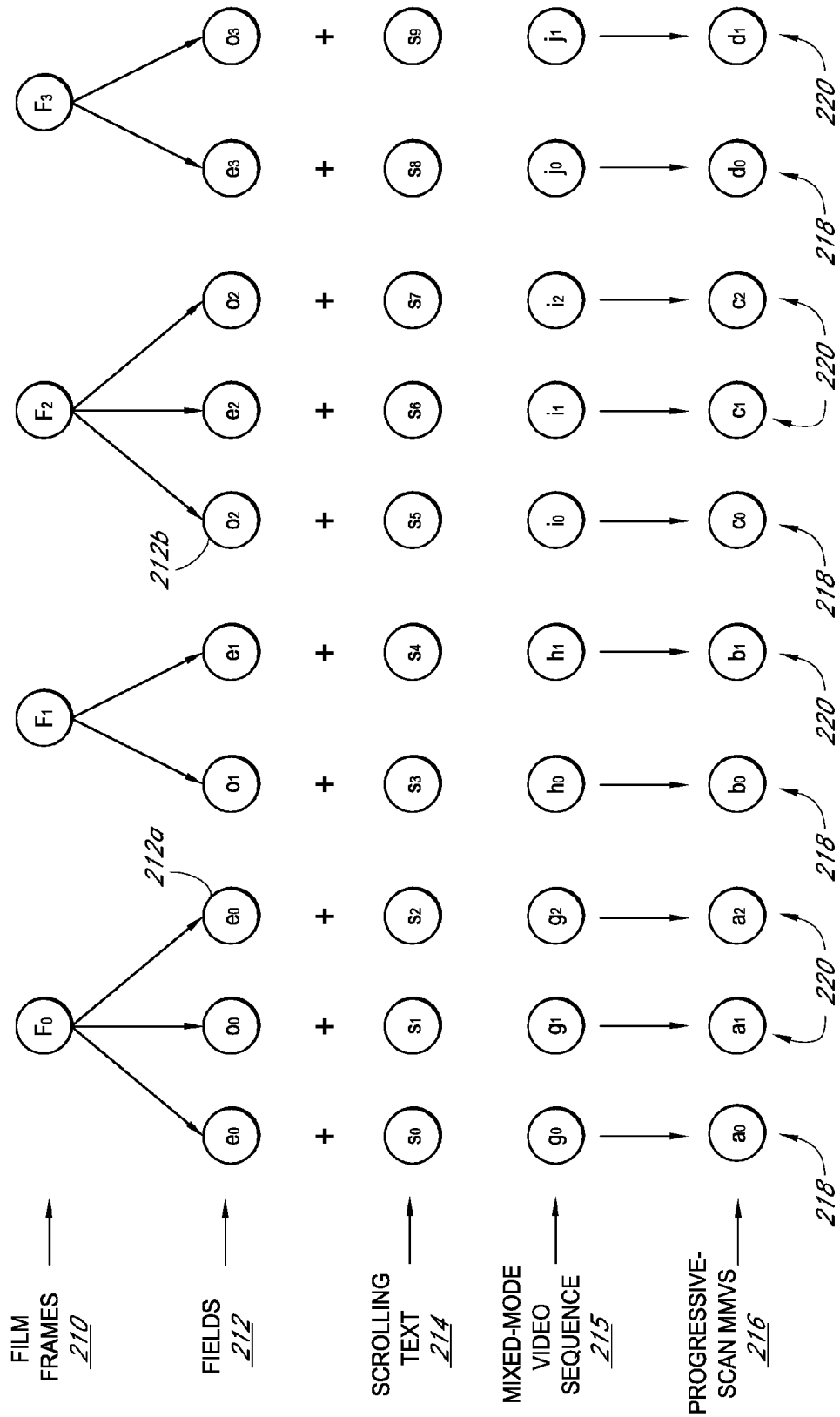
FIG. 2 illustrates an embodiment of mixed mode video sequence generation.

To illustrate why judder in the scrolling text may occur, FIG. 2 conceptually depicts the generation of an example MMVS. A series of film frames 210, denoted $F_i$ (i ranging from 0 to 3 in this example), are split into sets of even ($e_i$) and odd ($o_i$) fields 212 in a 3:2 pulldown process. The 3:2 pulldown process creates three alternating even and odd fields 212 for a first film frame $F_0$ 210, two alternating odd and even fields 212 for a second film frame $F_1$ 210, and so on. Each field 212 can represent half or approximately half of the information in a particular frame 210.

Scrolling text frames ($s_0, s_1, \ldots, s_n$) 214 are then added to the odd and even fields 212 to create a MMVS 215 ($g_0, g_1, g_2, h_0, h_1$, etc.). The scrolling text frames 214 may differ from each other, so that there can be motion between each scrolling text frame 214. (At least some of the scrolling text frames 214 may be repeated in some instances.) This motion contrasts with the even and odd fields 212, which tend not to exhibit motion within a particular three- or two-field set. As a result, if motion judder cancellation were to be applied to the MMVS 215, the film information contained in the MMVS 215 would appear smooth, but judder might be introduced into the scrolling text.

The MMVS 215 may then be deinterlaced to create a progress-scan MMVS. In one embodiment, deinterlacing is performed by interpolating the MMVS 215 into progressive-scan frames 218, 220. Effectively, each progressive-scan frame 218, 220 can be an approximation of a field 212 combined with a scrolling text frame 214. Thus, for example, the progressive-scan frames $a_0, a_1$, and $a_2$ might all appear similar to the film frame $F_0$, with the addition of scrolling text from scrolling text frames $s_0, s_1$, and $s_2$. The progressive-scan frames 218, 220 are also repeated in sets of three frames and two frames. Because the progressive-scan frames 218, 220 repeat, in one embodiment there is little or no motion in the film part of the frames 218, 220 between frames of a particular three- or two-frame set.

In various embodiments, scrolling text 214 may be detected in either the MMVS 215 or the progressive-scan MMVS 216. Detection may be desirable because a video receiver may not receive an indication of what parts of the video stream may contain scrolling text. Detecting the scrolling text beneficially allows motion judder cancellation to be disabled when scrolling text is detected. As a result, the post-cancellation MMVS may be perceived as having smooth scrolling text.

In one embodiment, scrolling text may be detected by analyzing primary frames 218 and secondary frames 220. A primary frame 218 in certain embodiments is the first frame of a set of three or two frames in the progressive-scan MMVS 216. Thus, the depicted example primary frames 218 include frames $a_0, b_0, c_0$, and $d_0$. Changes in film information can occur between the primary frames 218 because each primary frame 220 is the first frame in a three- or two-frame set that was derived from a film frame 210.

The secondary frames 220 are the remaining frames. In one embodiment, no change in film information occurs between primary frames 218 and associated secondary frames 220. However, changes in the scrolling text information can occur between both the primary and secondary frames 218, 220. Advantageously, in certain embodiments, the primary and/or secondary frames 218, 220 can be analyzed to detect scrolling text.

II. Embodiments of Scrolling Region Detection

Figure 3:
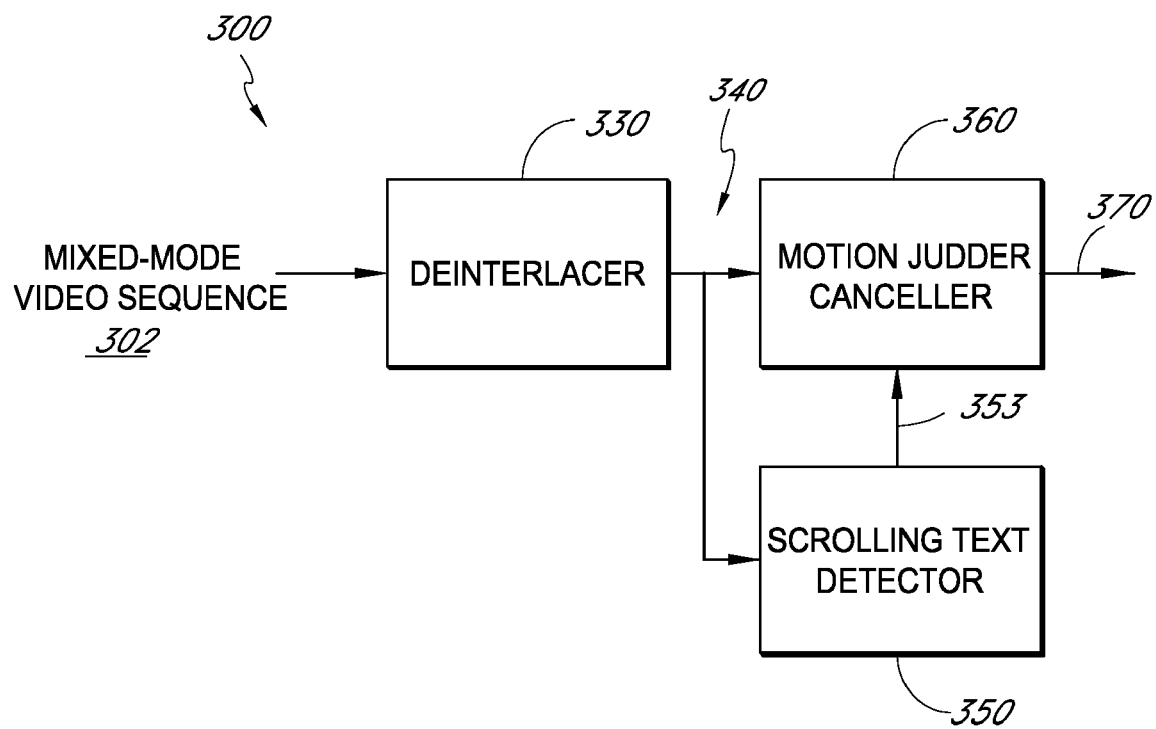
FIG. 3 illustrates an embodiment of a scrolling text detection system.

FIG. 3 illustrates an embodiment of a scrolling text detection system 300. In certain embodiments, the scrolling text detection system 300 facilitates detecting scrolling text in a MMVS 302. The components in the scrolling text detection system 300 may be implemented as hardware and/or software. For example, the scrolling text detection system 300 may be implemented in a television set, digital video player, computer, or any other device having one or more processors. While the techniques described herein for detecting scrolling text may be applied to both horizontal and vertical scrolling text, for ease of illustration, the remainder of this disclosure shall refer solely to vertical scrolling text.

In an embodiment, the deinterlacer 330 receives the MMVS 302, which may include digitized film and scrolling text. The MMVS 302 might be received from, for example, a broadcaster, the Internet, or the like. The deinterlacer 330 interpolates the film information in the MMVS 302 to create a progressive-scan MMVS 340. The deinterlacer 330 provides the progressive-scan MMVS 340 to a scrolling text detector 350 and to a motion judder canceller 360.

In some embodiments, the MMVS 302 may already be in progressive-scan form. In these embodiments, the deinterlacer 330 may simply pass the MMVS 302 directly to the motion judder canceller 360 and scrolling text detector 350. Alternatively, the deinterlacer 330 may be omitted in these embodiments.

The scrolling text detector 350 may analyze primary and secondary frames in the progressive-scan MMVS 340 to detect scrolling text. In one embodiment, the scrolling text detector generates a plurality of motion vectors between blocks of two or more primary frames of the MMVS. The scrolling text detector 350 then analyzes the motion vectors to detect substantially constant vertical motion of at least some of the blocks between the primary frames. The presence of substantially constant vertical motion in certain embodiments indicates a possible presence of vertical scrolling text.

In addition, the scrolling text detector 350 may calculate differences in pixel values between blocks or lines of two or more consecutive frames in the MMVS. These differences in pixel values may be further indicative of the presence of scrolling text. Implementations of scrolling text detection are described in greater detail below with respect to FIGS. 4 through 9.

The scrolling text detector 350 may provide a bypass or control signal 353 to the motion judder canceller 360. The bypass or disable signal 353 may cause the motion judder canceller 360 to disable motion judder cancellation on the frames that contain scrolling text. Alternatively, the scrolling text detector 350 may provide an indication to the motion judder canceller 360 that scrolling text has been detected. In response, the motion judder canceller 360 may disable motion judder cancellation. In either case, the scrolling text detection system 300 can enable smoother scrolling text to be output for display in certain embodiments.

Thus, in certain embodiments, the scrolling text detector 350 transforms frames that represent a film into an indication of scrolling text or into a bypass signal. The frames may be stored in a data structure, such as a matrix. The scrolling text detector 350 can therefore perform operations on the matrix to transform the matrix into a scrolling text indicator or a control signal. The scrolling text indicator or data associated with the bypass signal may be stored in a memory device.

Figure 4:
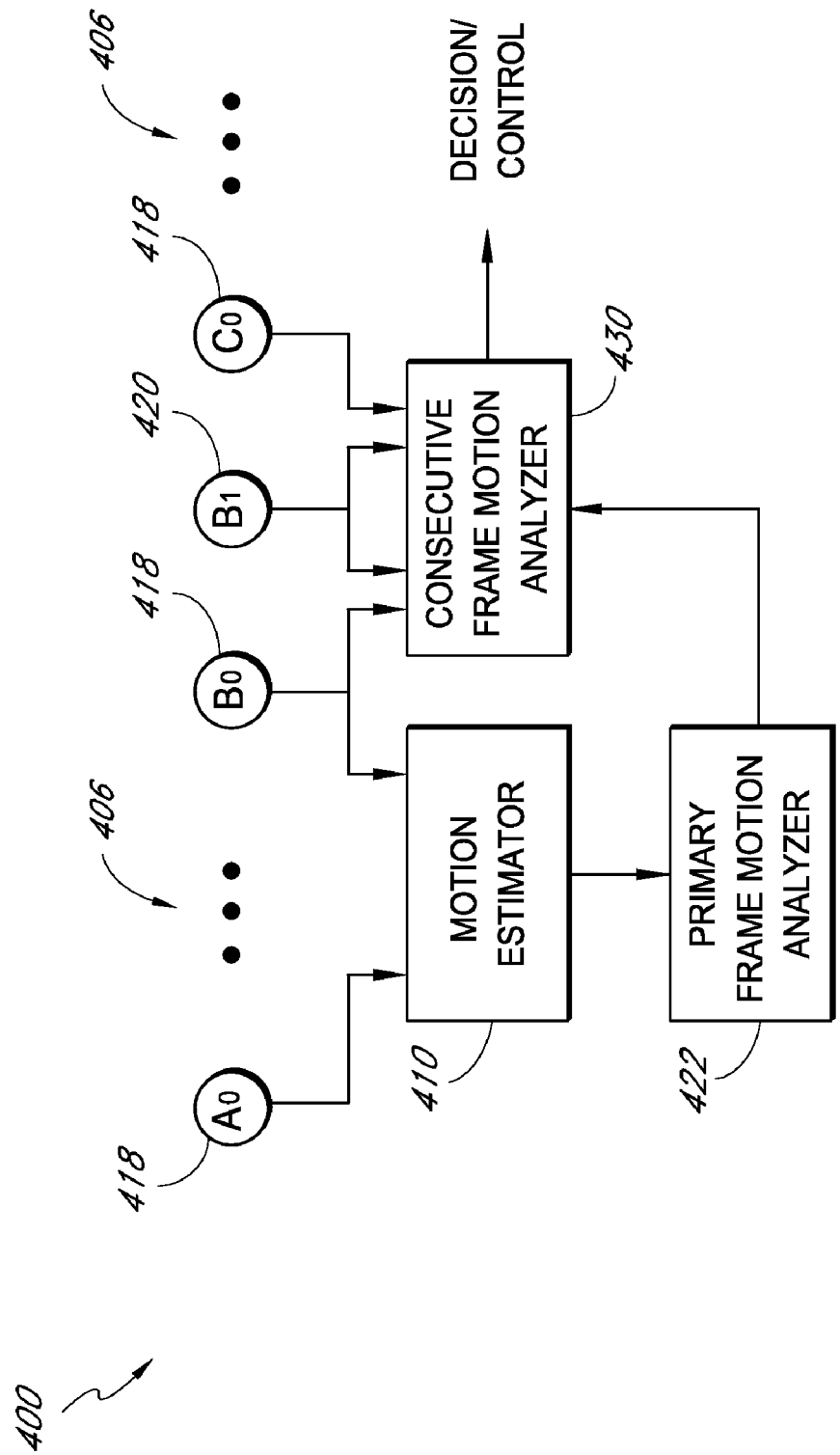
FIG. 4 illustrates an embodiment of a scrolling text detector.

FIG. 4 illustrates an embodiment of a scrolling text detector 450. The scrolling text detector 450 is an example implementation of the scrolling text detector 350 of FIG. 3. The various components of the scrolling text detector 450 may be implemented as hardware and/or software. The scrolling text detector 450 receives primary frames 418 and secondary frames 420 of a progressive-scan MMVS. Only a few frames 418, 420 of a MMVS are shown for clarity. Ellipses 406 indicate that additional frames may be received by the scrolling text detector 450. In addition, for ease of illustration, not all possible operations on the frames 418, 420 are shown.

The scrolling text detector 450 includes a motion estimator 410 that may receive primary frames 418 and estimate motion between the primary frames 418. As discussed above, motion in the film can occur between primary frames 418 of the video sequence because each primary frame 418 is the start of a repeated set of three or two frames 418, 420. In addition, because scrolling text may also be moving in the primary frames 418, the motion estimator 410 may estimate both film and scrolling text motion.

In the depicted embodiment, the motion estimator 410 estimates motion between the primary frames 418 $A_0$ and $B_0$. Although not shown, the motion estimator 410 may also estimate motion between primary frames 418 $B_0$ and $C_0$. As additional primary frames 418 are received, the motion estimator 410 can compare each pair of primary frames 418 in turn. In one implementation, the motion estimator 410 performs a motion estimation algorithm to estimate motion between the primary frames 418. This algorithm may be, for example, a block-matching algorithm or a 3-D recursive motion estimation (RME) algorithm. For example, if a block-matching algorithm were used, the primary frames 418 could be divided into blocks of pixels.

The motion estimator 410 may estimate motion vectors between two primary frames 418 by comparing pixels in blocks of a first primary frame 418 and displaced blocks of similar shape and size in a second primary frame 418. Each motion vector can represent a geometrical displacement between two matched blocks. For a primary frame 418 divided into several blocks, the block-matching algorithm may provide a field of motion vectors.

The motion estimator 410 of certain embodiments provides motion vectors, a motion vector field, or in some embodiments, vertical components of motion vectors to a primary frame motion analyzer 420. The primary frame motion analyzer 420 analyzes the motion vector field corresponding to two or more primary frames 418 to detect constant or substantially constant vertical motion between the two or more primary frames 418. Constant vertical motion may be indicative of vertical scrolling text because text such as credits often scrolls at a constant rate.

In certain embodiments, the primary frame motion analyzer 420 determines a first peak vertical motion vector between first and second primary frames (e.g, $A_0$ and $B_0$) and a second peak vertical motion vector between the second primary frame and a third primary frame (e.g, $B_0$ and $C_0$). The primary frame motion analyzer 420 may then compare an average vertical distance traveled over each consecutive frame by the first and second peak motion vector. (Consecutive frames may include primary frames 418 and secondary frames 420 that follow one another in the MMVS, such as $B_1$ and $C_0$.) If the average vertical distance for each peak motion vector is approximately the same, the primary frame motion analyzer 422 determines that there may be vertical scrolling text in the primary frames 418.

To illustrate, if the first peak motion vector traveled 12 pixels in the vertical direction over 3 consecutive frames (from $A_0$ to $B_0$), the average distance traveled would be 4 pixels. Similarly, the average distance traveled for a peak motion vector of 8 pixels in the vertical direction over the next 2 consecutive frames (from $B_0$ to $C_0$) would also be 4 pixels. Because both of these averages are the same, the primary frame motion analyzer 422 might determine that vertical scrolling text may be present between the frames $A_0$ and $C_0$.

In an embodiment, the primary frame motion analyzer 420 provides an indication to a consecutive frame motion analyzer 430 that indicates whether or not vertical motion, and hence scrolling text, may be present in the two primary frames 418. The consecutive frame motion analyzer 430 may perform further analysis to confirm whether vertical scrolling text exists in the frames. However, if the primary frame motion analyzer 420 does not indicate the possible existence of scrolling text, the consecutive frame motion analyzer 430 may not perform any analysis. Alternatively, the consecutive frame motion analyzer 430 performs further analysis regardless of the indication provided by the primary frame motion analyzer 420.

The consecutive frame motion analyzer 430 can analyze consecutive frames 432 to detect the presence of scrolling text between the consecutive frames. For clarity, only a few consecutive frames (e.g., $B_0$, $B_1$ and $B_1$, $C_0$) are shown being analyzed; however, in certain embodiments, most or all consecutive frames are analyzed. The consecutive frame motion analyzer 430 calculates differences in pixel values between blocks or lines of a first consecutive frame and a previous consecutive frame. If there is scrolling text in the consecutive frames, the text in the previous consecutive frame may be offset (e.g., at a different position) from the text in the first consecutive frame, due to the motion of the text. Thus, in an embodiment, the consecutive frame motion analyzer 430 analyzes blocks at the same position in each consecutive frame. If the differences between these blocks are above a threshold, there may be text at an offset position in the previous consecutive frame.

Based on the indication received from the primary frame motion analyzer 422 and the calculated pixel differences, the consecutive frame motion analyzer 430 determines whether there is scrolling text present in two or more frames. The consecutive frame motion analyzer 430 can output a decision indicating whether there is scrolling text in the frames. In another embodiment, the consecutive frame motion analyzer 430 may output a control signal that causes the motion judder canceller 360 to be bypassed or disabled for the frames containing scrolling text.

In an alternative embodiment, the motion estimator 410 estimates motion between repeated frames 420 as well as primary frames 418. More detailed information on this alternative embodiment are described below, after FIG. 9. In still other embodiments, either the primary frame motion analyzer 422 or the consecutive frame motion analyzer 430 are used alone to detect vertical scrolling text.

Figure 5:
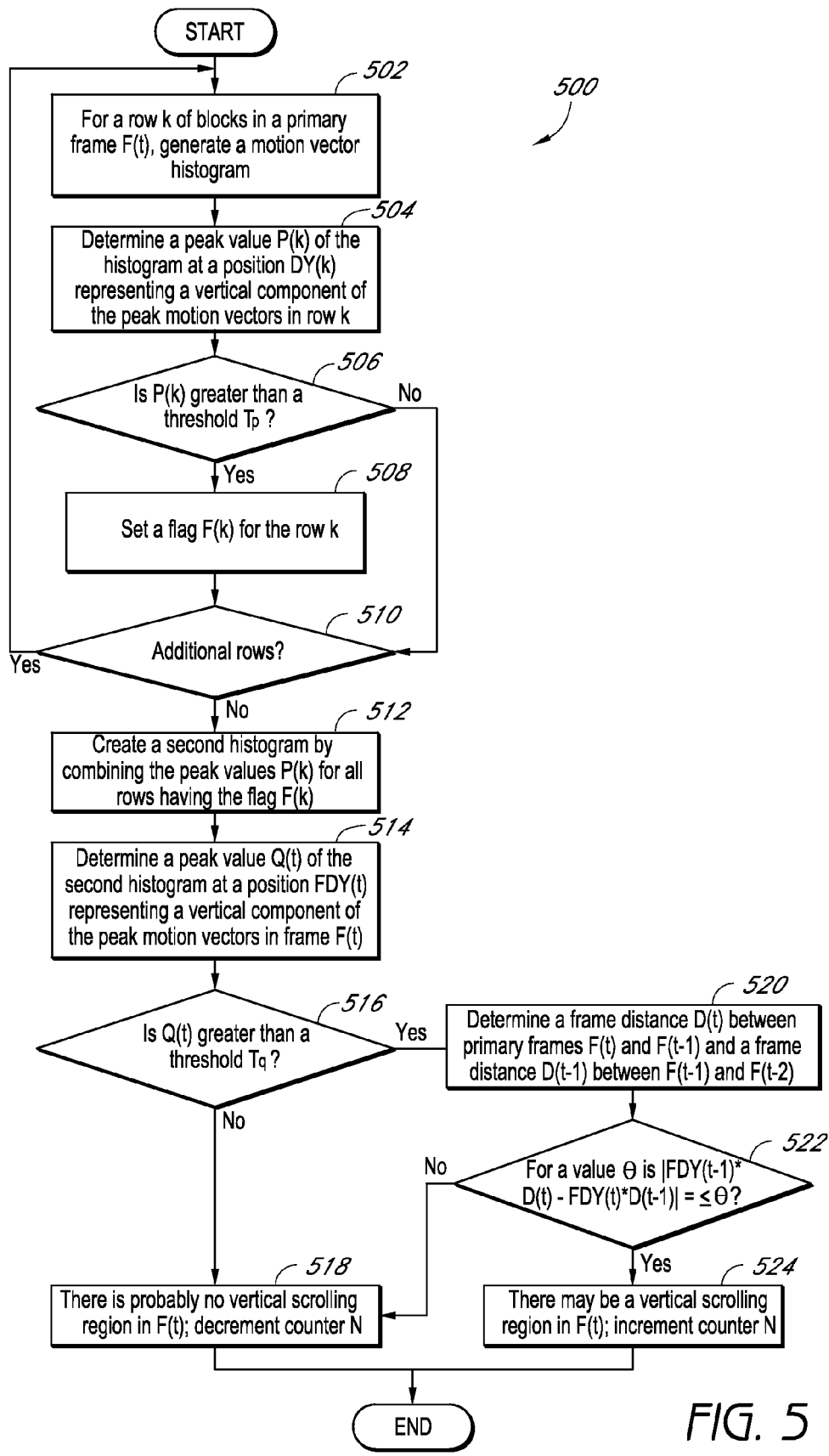
FIG. 5 illustrates an embodiment of a process for detecting a vertical scrolling region in a mixed-mode video sequence.

FIG. 5 illustrates an embodiment of a primary frame analysis process 500 for detecting a vertical scrolling region in a MMVS. The primary frame analysis process 500 may be implemented by a scrolling text detector, such as the scrolling text detector 350 or 450. More particularly, in certain embodiments, the functions of the primary frame analysis process 500 are performed by the primary frame motion analyzer 422. Advantageously, in certain embodiments, the primary frame analysis process 500 detects substantially constant vertical motion for vertical scrolling regions.

At block 502, for a row k of blocks in a primary frame F(t), a motion vector histogram is generated. The variable "t" is used to refer to a temporal sequence of frames. For instance, a first primary frame might be F(t), a second primary frame might be F(t+1), a previous primary frame might be F(t−1), and so on.

Figure 6:
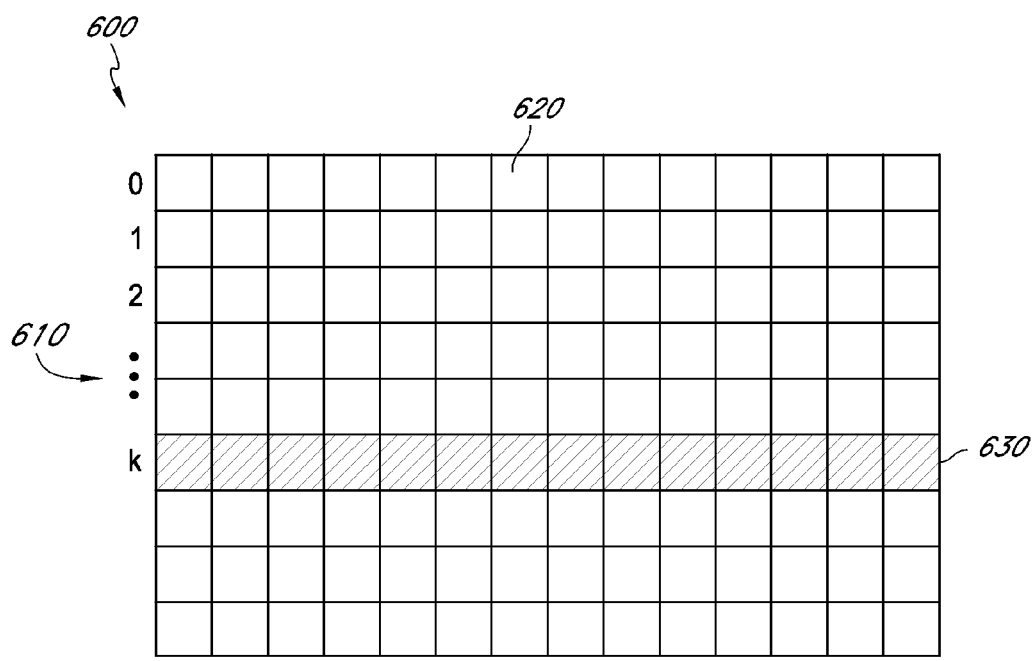
FIG. 6 illustrates an example frame divided into blocks in accordance with the process of FIG. 5.

As an example of block rows, FIG. 6 depicts an example primary frame 600 that is divided into blocks 620. Rows 610 of blocks numbered from 0, 1, . . . , k are shown, and the kth row 630 is highlighted. In certain embodiments, the primary frame analysis process 500 of FIG. 5 may analyze some or all of the rows 610 in the primary frame 600. Although the rows 610 are shown stretching across the entire horizontal width of the primary frame 600, the rows 610 may instead include a subset of the horizontal width in some embodiments.

Figure 7:
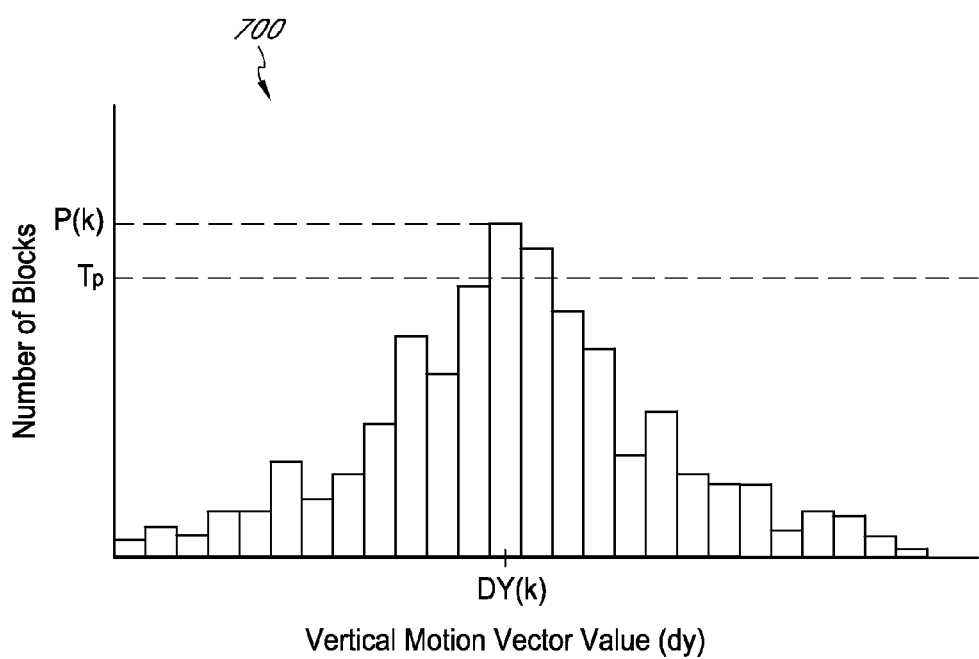
FIG. 7 illustrates an example histogram of motion vector values in accordance with the process of FIG. 5.

A graphical depiction of an example histogram 700 is shown in FIG. 7. The example histogram 700 tracks a number of blocks that have the same vertical motion vector value (dy). The histogram generated by the primary frame analysis process 500 need not be displayed to a user in certain embodiments. Rather, a data structure or the like representing a histogram may be constructed.

Referring again to FIG. 5, at block 504, a peak value P(k) of the histogram at a position DY(k) is determined, representing a vertical component of the peak motion vectors in the row k. This peak value P(k) is shown in the example histogram 700 of FIG. 7. In FIG. 7, the largest number of blocks that have the same vertical motion vector value have the motion vector value DY(k), and the number of blocks that have this value is P(k).

It is determined at block 506 of FIG. 5 whether P(k) is greater than a threshold $T_p$. This threshold $T_p$ is illustrated in FIG. 7. If P(k) is greater than the threshold, a flag F(k) is set for the row k at block 508 and the primary frame analysis process 500 proceeds to block 510, where it is determined whether additional rows are to be evaluated. However, if P(k) is less than the threshold, then the primary frame analysis process 500 proceeds directly to block 510.

If additional rows remain to be evaluated, then the primary frame analysis process 500 loops back to block 502. Otherwise, a second histogram is created at block 512 by combining the peak values P(k) for all rows having the flag F(k) set. Because certain P(k) values may have different DY(k) values, a histogram similar to the histogram of FIG. 7 may be generated. If there is vertical scrolling text present in multiple rows, then it is possible that these rows have peak values P(k) at the same DY(k) position. Thus, a peak value Q(t) of this second histogram may be indicative of vertical scrolling text. In an alternative embodiment, each P(k) is assigned a number (e.g., 1), and these P(k) values are combined into the histogram.

Accordingly, at block 514, the peak value Q(t) of this second histogram is determined at a position FDY(t), representing a vertical component of the peak motion vectors in frame F(t). At decision block 516, it is determined whether Q(t) is greater than a threshold $T_q$. If not, it is determined at block 518 that there is probably no vertical scrolling region in the primary frame F(t). In addition, in certain embodiments, a counter N is decremented.

On the other hand, if Q(t) is greater than a threshold $T_q$, the primary frame analysis process 500 proceeds to block 520. At block 520, a frame distance D(t) between primary frames F(t) and F(t−1) is determined. Likewise, a frame distance D(t−1) between F(t−1) and F(t−2) is also determined. To illustrate with an example, in FIG. 4, if $C_0$ were F(t), $B_0$ would be F(t−1) and $A_0$ would be F(t−2). The frame distance D(t) between $C_0$ and $B_0$ would be 2 frames ($B_0$ to $B_1$ to $C_0$). The frame distance D(t−1) between $B_0$ and $A_0$ would be 3 frames (although not shown, $A_0$ to $A_1$ to $A_2$ to $B_0$).

At decision block 522 of FIG. 5, it is determined for small θ, whether $$|FDY(t-1) \cdot D(t) - FDY(t) \cdot D(t-1)| \leq \theta \quad (1)$$

or equivalently, whether $$FDY(t-1) \cdot D(t) - \theta \leq FDY(t) \cdot D(t-1) \leq FDY(t-1) \cdot D(t) + \theta \quad (2)$$

where FDY(t−1) represents a vertical component of the peak motion vectors in frame F(t−1). FDY(t−1) may have been calculated, for instance, in a previous iteration of the primary frame analysis process 500.

Expression (1) or (2) effectively determines whether FDY(t−1)*D(t) is approximately equal to FDY(t)*D(t−1). Thus, expression (1) or (2) may be rewritten as follows:

$$\left| \frac{FDY(t-1)}{D(t-1)} \right| \approx \left| \frac{FDY(t)}{D(t)} \right| \quad (3)$$

Expression (3) compares an average vertical distance traveled over each consecutive frame by the peak motion vectors (of vertical component value FDY) over frames F(t), F(t−1), and F(t−2). Each side of expression (3) represents the average number of pixels per consecutive frame that a peak number of blocks moved vertically.

Thus, for a 3:2 pulldown MMVS, if the average vertical distance traveled through 3 consecutive frames is approximately the same as the average vertical distance traveled through 2 consecutive frames, there is probably a vertical scrolling region in those frames. Other pulldown sequences may have different D(t) and D(t−1) values. For instance, a 2:2 pulldown would result in D(t) and D(t−1) both equaling 2. Thus, expression (3) might be simplified to $$|FDY(t-1)| \approx |FDY(t)| \qquad (4)$$

If the condition of block 522 is false, at block 518 it is further determined that there is probably no vertical scrolling region in the frame F(t), and the counter N is decremented. On the other hand, if the condition is true, then at block 524 it is determined that there is probably vertical scrolling region in the frame F(t), and the counter N is incremented. In alternative embodiments, the counter N is not used.

Figure 8:
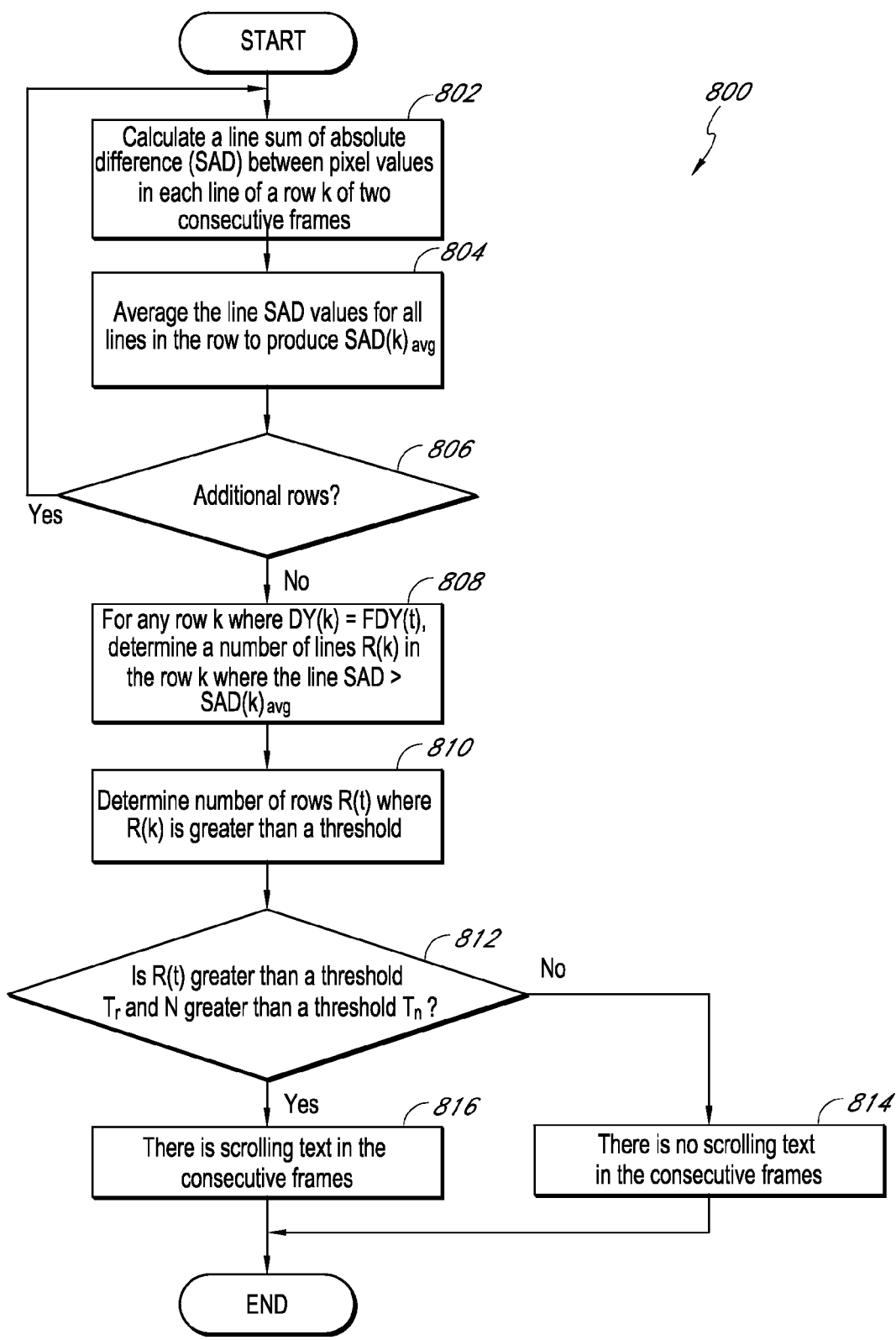
FIG. 8 illustrates another embodiment of a process for detecting a vertical scrolling region.

FIG. 8 illustrates an embodiment of a consecutive frame analysis process 800 for detecting that a vertical scrolling region exists in a MMVS. The consecutive frame analysis process 800 may be implemented by a scrolling text detector, such as the scrolling text detector 350 or 450. More particularly, in certain embodiments, the functions of the consecutive frame analysis process 800 are performed by the consecutive frame motion analyzer 430.

In certain embodiments, the consecutive frame analysis process 800 executes after the primary frame analysis process 500 to further confirm the existence of a vertical scrolling region. However, these processes 500, 800 may also run in parallel or substantially parallel in certain implementations. Alternatively, either the process 500 or 800 may be used independently to detect a vertical scrolling region.

Figure 9:
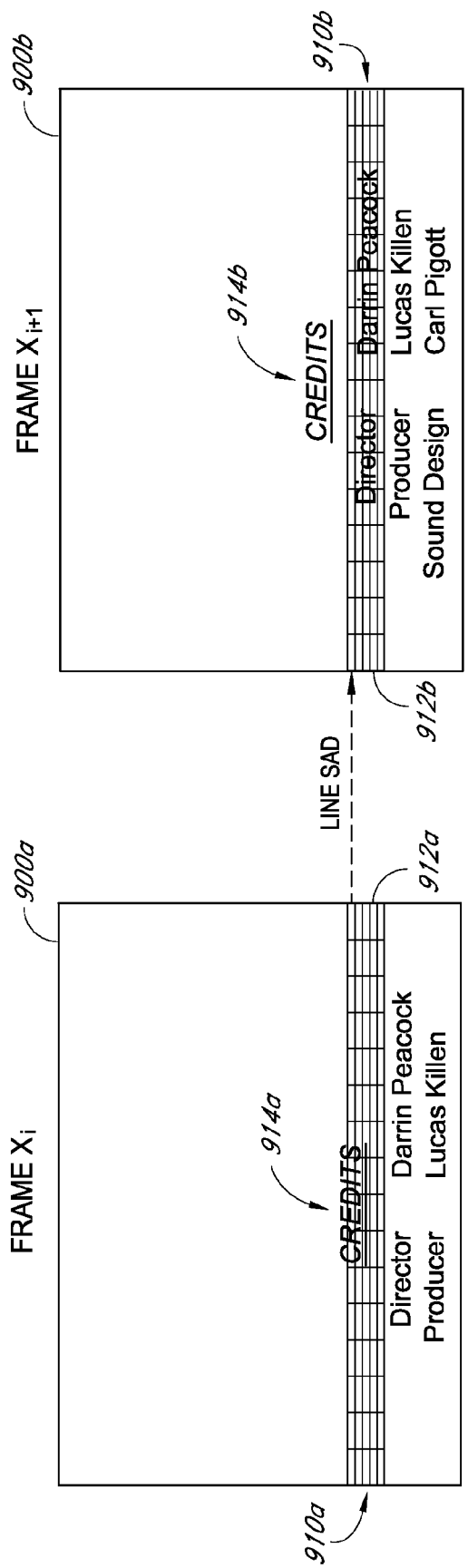
FIG. 9 illustrates an embodiment of a difference operation in accordance with the process of FIG. 8.

At block 802, a line sum of absolute differences (SAD) is calculated between pixel values in each line in the same row k of two consecutive frames. FIG. 9 illustrates two consecutive frames, $X_i$ and $X_{i+1}$. A row k 910a, 910b in each frame 900a, 900b includes lines 912a, 912b. Scrolling text 914a in the first frame $X_i$ is shown in a different vertical position in the second frame $X_{i+1}$. The line SAD can be taken between two corresponding lines 912a, 912b for each line in the row 910.

In lines where the line SAD is large, there may have been scrolling text in those lines. This can be seen from the figure, where the lines 912a, 912b include different scrolling text 914a. Thus, as will be described in further detail below, multiple lines and/or rows of the consecutive frames 900 may be analyzed to determine if significant differences exist between the two frames. Significant differences can be indicative of vertical scrolling text.

Referring again to FIG. 8, at block 804 the line SAD is averaged for all lines in the row to produce SAD(k)$_{avg}$. It is then determined at decision block 806 whether there are additional rows to evaluate. If so, the consecutive frame analysis process 800 loops back to block 802. Otherwise, the consecutive frame analysis process 800 proceeds to block 808.

At block 808, for any row k where DY(k)=FDY(t), a number of lines R(k) in the row k is determined where the line SAD is greater than the SAD(k)$_{avg}$. At block 810, a number of rows R(t) is determined where R(k) is greater than a threshold. It is then determined at decision block 812 whether R(t) is greater than a threshold $T_r$ and whether N (determined above with respect to FIG. 5) is greater than a threshold $T_n$. If not, it is determined at block 814 that there is no scrolling text in the consecutive frames. Otherwise, it is determined at block 816 that there is scrolling text in the consecutive frames.

When DY(k) equals FDY(t), as determined above with respect to FIG. 5, the peak motion vector for the row k has the same vertical component (DY(k)) as the vertical component (FDY(t)) of the peak motion vector for the frame. Thus, blocks 808 through 816 further examine such rows for the presence of a vertical scrolling region.

In certain alternative embodiments, the SAD value of entire rows, rather than lines in the rows, is calculated. In other embodiments, differences other than SAD are used, such as mean absolute difference.

III. Alternative Embodiment

In an alternative embodiment, motion estimation is applied to each incoming or consecutive frame, rather than just to primary frames. However, motion analysis might only be applied on the secondary (repeated) frames, such as $B_1$, $C_1$, $C_2$, $D_1$, and so forth.

Motion analysis could proceed on the secondary frames as described above with respect to FIG. 5. However, in place of blocks 520 and 522, it could be determined whether for small β if $$FDY(t-1)-\beta <= FDY(t) <= FDY(t-1)+\beta, \qquad (5)$$

where FDY(t) represents a vertical component of peak motion vectors in a secondary frame S(t) and FDY(t−1) represents a vertical component of peak motion vectors in a previous secondary frame S(t−1). If the condition of expression (5) is true, then the process would proceed to block 524 (there may be scrolling text); otherwise, the process would proceed to block 518 (likely no scrolling text).

Motion analysis could further proceed as described above with respect to FIG. 8. However, instead of calculating the line SAD for each consecutive frame at block 802, the line SAD between repeated secondary frames may be calculated.

IV. Conclusion

Vertical scrolling regions may be detected by detecting substantially constant motion through comparing average vertical motion vector values over two or more frames. In addition, differences between pixel values in consecutive frames can be determined to confirm the existence of a vertical scrolling region. While the embodiments described herein have been discussed in the context of vertical scrolling regions, certain of the techniques described herein may also be applied to detection of horizontal and other scrolling regions.

The various illustrative logical blocks, modules, and processes described herein may be implemented as electronic hardware, computer software, or combinations of both. To clearly illustrate this interchangeability of hardware and software, various illustrative components, blocks, modules, and states have been described above generally in terms of their functionality. However, while the various modules are illustrated separately, they may share some or all of the same underlying logic or code. Certain of the logical blocks, modules, and processes described herein may instead be implemented monolithically.

The various illustrative logical blocks, modules, and processes described herein may be implemented or performed by a machine, such as a computer, a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, a controller, microcontroller, state machine, combinations of the same, or the like. A processor may also be implemented as a combination of computing devices, e.g., a combination of a DSP and a microprocessor, a plurality of microprocessors or processor cores, one or more graphics or stream processors, one or more microprocessors in conjunction with a DSP, or any other such configuration.

The blocks or states of the processes described herein may be embodied directly in hardware, in a software module executed by a processor, or in a combination of the two. For example, each of the processes described above may also be embodied in, and fully automated by, software modules executed by one or more machines such as computers or computer processors. A module may reside in a computer readable medium such as RAM memory, flash memory, ROM memory, EPROM memory, EEPROM memory, registers, hard disk, a removable disk, a CD-ROM, memory capable of storing firmware, or any other form of computer-readable (e.g., storage) medium known in the art. An exemplary computer-readable medium can be coupled to a processor such that the processor can read information from, and write information to, the computer-readable medium. In the alternative, the computer-readable medium may be integral to the processor. The processor and the computer-readable medium may reside in an ASIC.

Depending on the embodiment, certain acts, events, or functions of any of the processes or algorithms described herein can be performed in a different sequence, may be added, merged, or left out all together. Thus, in certain embodiments, not all described acts or events are necessary for the practice of the processes. Moreover, in certain embodiments, acts or events may be performed concurrently, e.g., through multi-threaded processing, interrupt processing, or via multiple processors or processor cores, rather than sequentially.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the logical blocks, modules, and processes illustrated may be made without departing from the spirit of the disclosure. As will be recognized, certain embodiments of the inventions described herein may be embodied within a form that does not provide all of the features and benefits set forth herein, as some features may be used or practiced separately from others. The scope of certain inventions disclosed herein is indicated by the claims rather than by the foregoing description. All changes which come within the meaning and range of equivalency of the claims are to be embraced within their scope.

What is claimed is:

1. A vertical scrolling text detector implemented in one or more processors, the vertical scrolling text detector operative to receive a digital video signal comprising vertical scrolling text mixed with a pulldown video sequence comprising primary frames and repeated frames, the vertical scrolling text detector comprising:

a motion estimator operative to determine a plurality of motion vectors between blocks of the primary frames;

a primary frame motion analyzer operative to:

determine a first peak vertical motion vector between first and second primary frames and a second peak vertical motion vector between the second primary frame and a third primary frame, average a value of the first peak vertical motion vector over the first primary frame and its repeated frames to produce a first average, average a value of the second peak vertical motion vector over the second primary frame and its repeated frames to produce a second average, and determine whether the first and second averages are approximately equal; and a consecutive frame motion analyzer operative to:

calculate differences in pixel values between blocks of two or more consecutive frames between the first and third primary frames, and in response to said determination that the first and second averages are approximately equal and that the differences in pixel values are greater than a threshold, determine that vertical scrolling text exists in the digital video signal.

2. The vertical scrolling text detector of claim 1, wherein the consecutive frame motion analyzer is further operative to disable motion judder cancellation in response to detecting the vertical scrolling text.

3. The vertical scrolling text detector of claim 1, wherein said determination that the first and second averages are approximately equal reflects substantially constant vertical motion between the primary frames.

4. The vertical scrolling text detector of claim 1, wherein a consecutive frame motion analyzer is further operative to calculate the differences in pixel values between blocks by at least calculating differences between lines of the blocks.

* * * * *